Nov. 27, 1956  J. F. JOY  2,771,907
PILOT CONTROLLED PISTON TYPE REVERSING VALVE
Original Filed Jan. 29, 1949  4 Sheets-Sheet 3
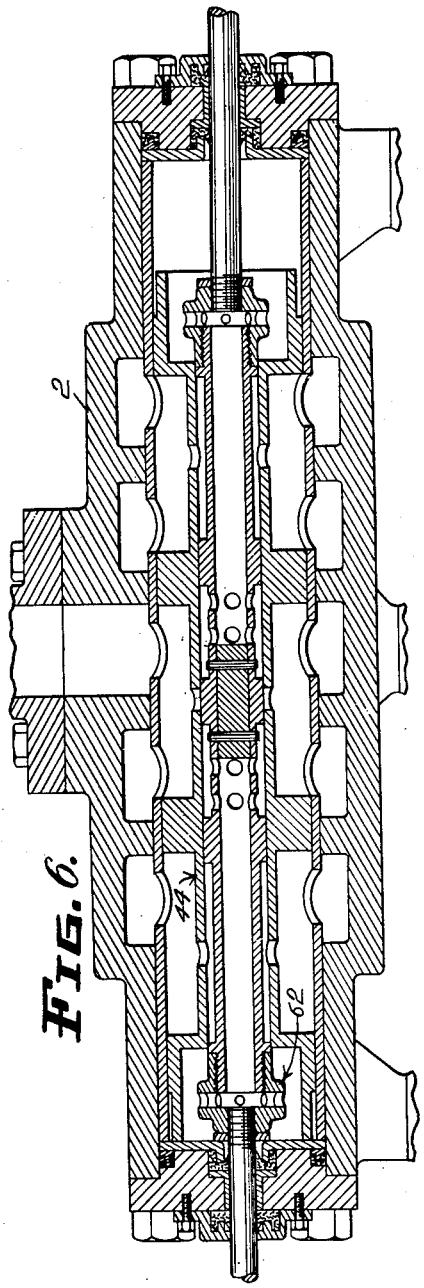
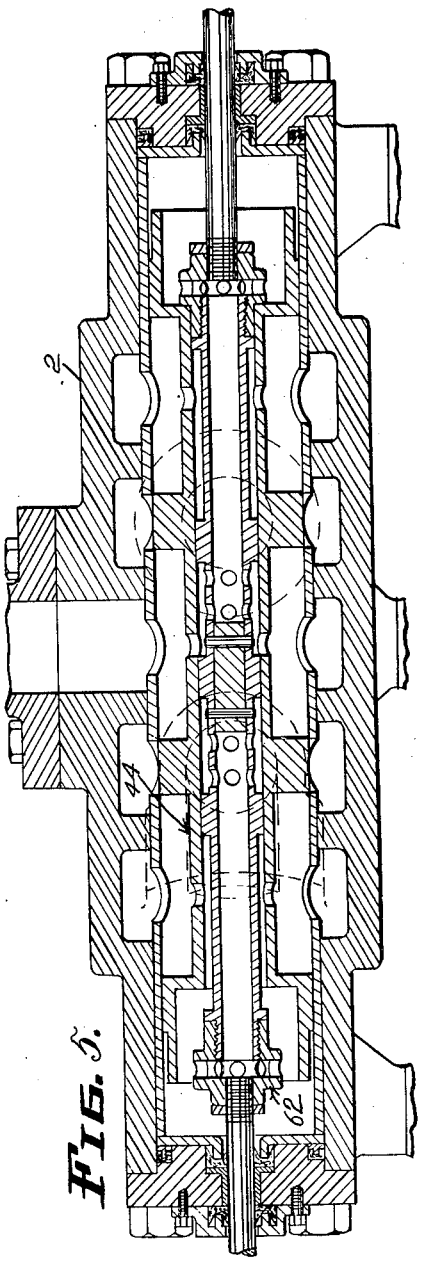
INVENTOR:
JOSEPH F. JOY
BY John F. Schmidt
ATTORNEY

United States Patent Office 2,771,907
Patented Nov. 27, 1956

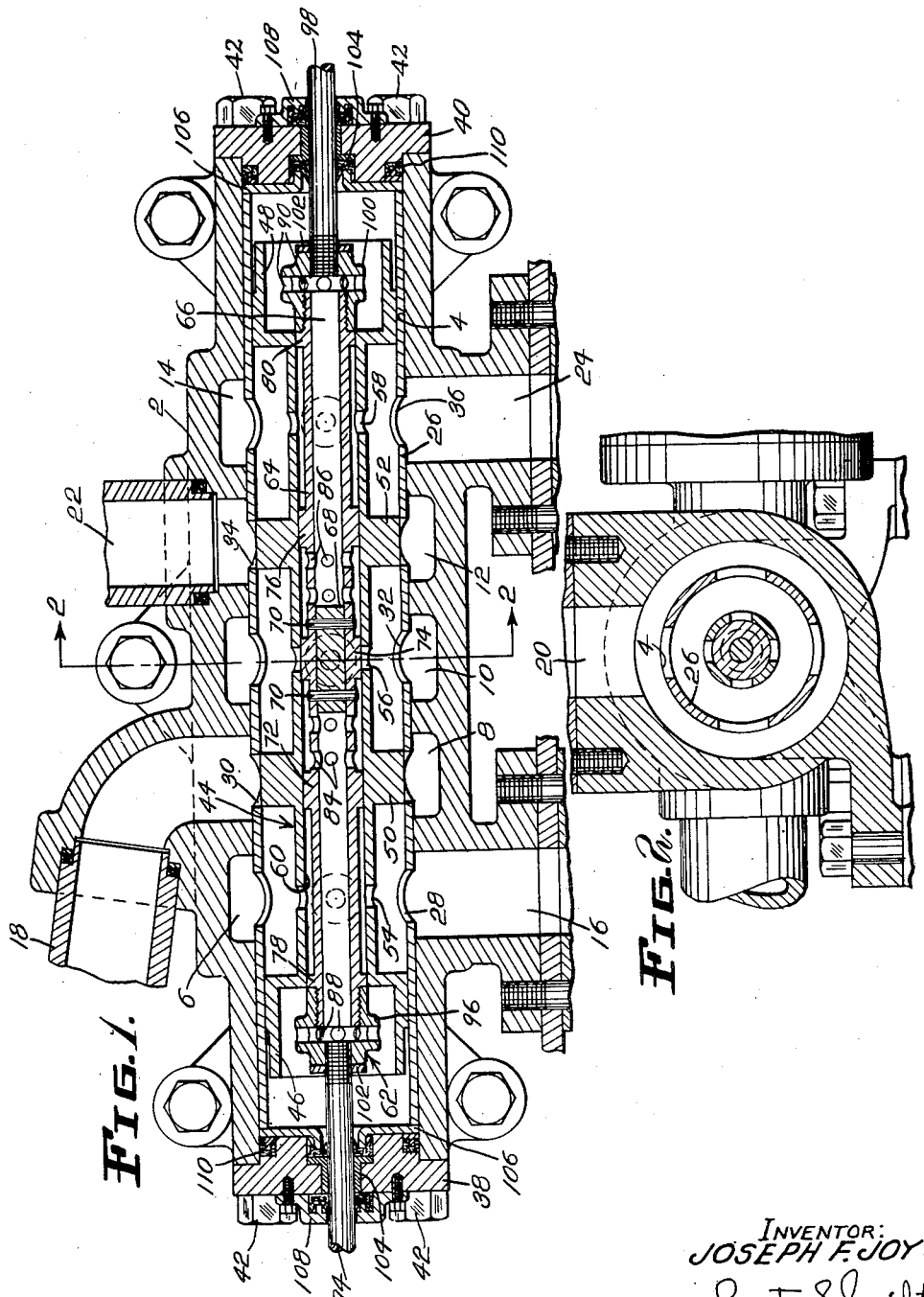

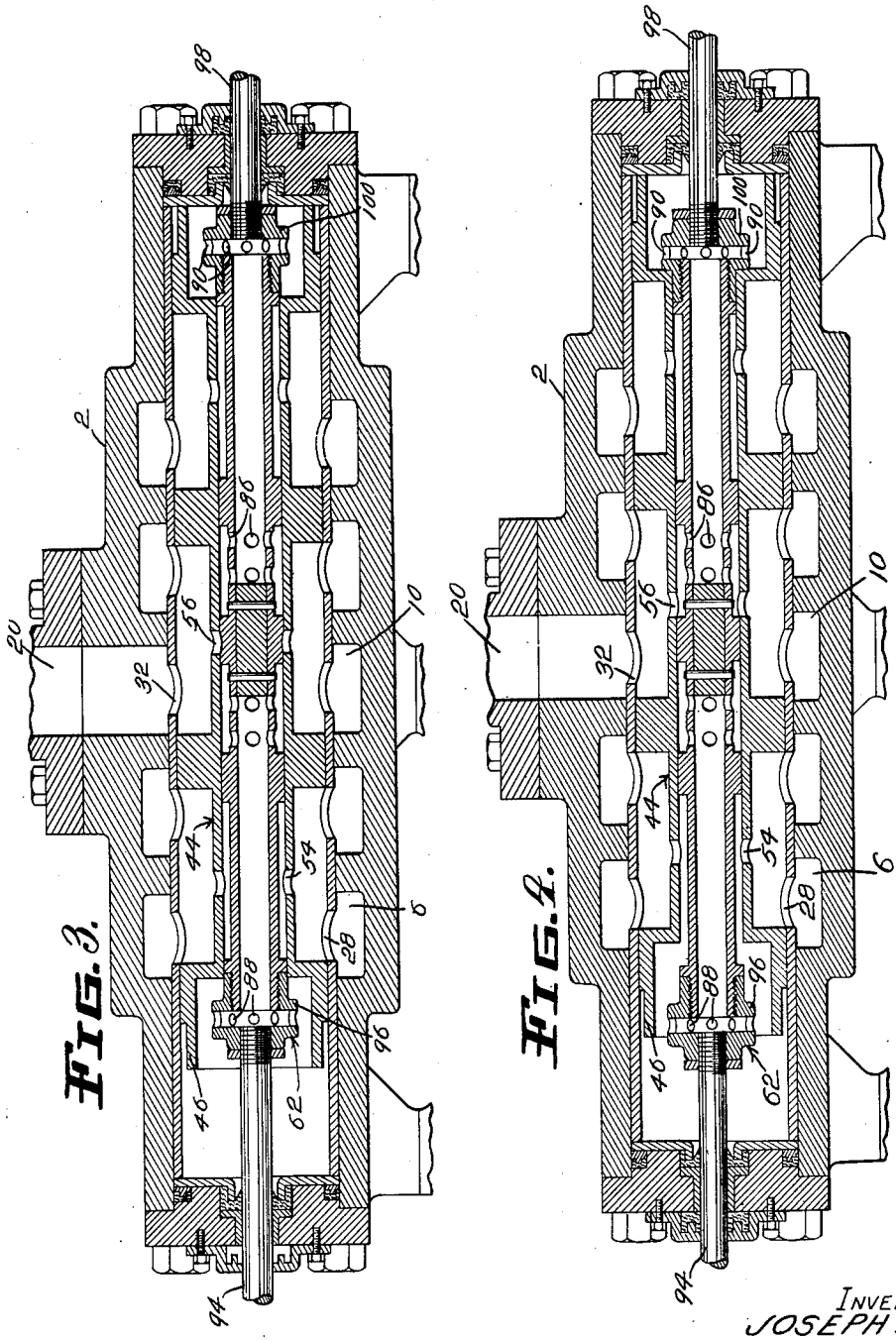

2,771,907

PILOT CONTROLLED PISTON TYPE REVERSING VALVE

Joseph F. Joy, Pittsburgh, Pa., assignor to Joy Manufacturing Company, Pittsburgh, Pa., a corporation of Pennsylvania Original application January 29, 1949, Serial No. 73,625. Divided and this application September 27, 1951, Serial No. 248,573

2 Claims. (Cl. 137—622)

This invention relates to a reversing valve for hydraulic systems, and is a division of my application Serial No. 73,625, filed January 29, 1949, now Patent No. 2,696,906, of December 14, 1954.

Hydraulic systems involving a hydraulic motor which reverses direction periodically, conventionally employ a reversing valve of some sort to reverse the direction of fluid flow. The action of such reversing valves must be quick, and they must be reliable. Many valves now in use in such systems are subject to the objectionable defect of "sticking," meaning seizure of the moving parts to the extent of preventing such relative movement as is necessary to successful operation. When such a valve sticks, the human operator, often an unskilled workman, is likely to jar the moving parts loose by striking the valve housing a sharp blow with a hammer. Obviously, such treatment, especially when repeated often, is almost certain to result in distortion of the carefully machined and alined cooperating surfaces, and in eventual damage to the extent of making the valve useless.

It is accordingly an object of this invention to provide a reversing valve for a fluid system which operates quickly and reliably and which is not subject to such seizure of the moving parts as will render the valve inoperative unless struck a blow from an external source. This and other objects are accomplished in a valve having a pilot member which is externally actuated and which engages and positively moves the main valve member should it stick momentarily.

In the drawings:

Fig. 1 is a longitudinal sectional view through the reversing valve showing the valve in a neutral position.

Fig. 2 is a view in section on line 2—2 of Fig. 1.

Fig. 3 is another longitudinal sectional view of the reversing valve shown with the plane of the section being perpendicular to the plane of the section of Fig. 1 and showing the valve in another position.

Fig. 4 is a view similar to Fig. 3, showing the valve in an operating position in which fluid is admitted to one end thereof to shift the valve to another operating position.

Figs. 5 and 6 are sectional views similar to Fig. 3 but showing the valve in other operating positions.

Figure 7:
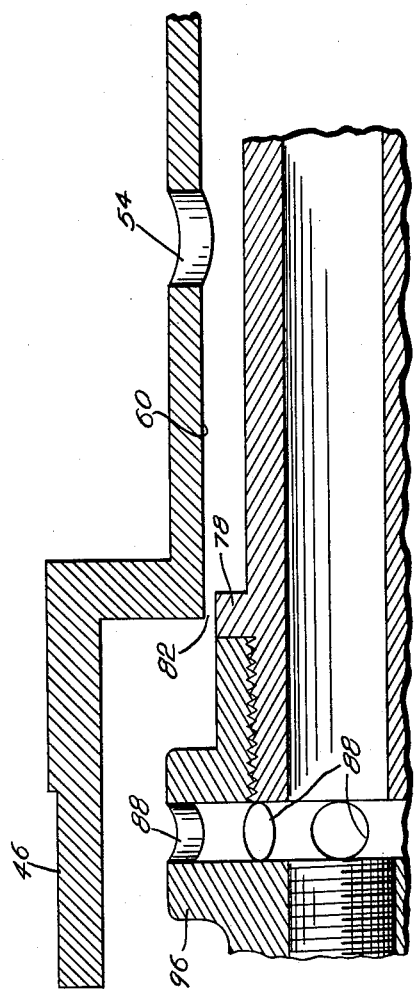
Fig. 7 is an enlarged detail view of a portion of the valve as shown in Fig. 6, but on a much larger scale.

The reversing valve will now be described in detail. A substantially cylindrical shell 2 is provided with an internal bore 4 and a plurality of internal grooves 6, 8, 10, 12, and 14. The grooves communicate respectively with a low pressure fluid connection 16, a pressure-fluid conduit 18, a high pressure fluid connection 20, a pressure-fluid conduit 22, and a low pressure fluid connection 24. If desired, the valve could be made with the grooves communicating directly with the bore, but a preferred form of construction is that shown, in which a sleeve 26 snugly fits the bore 4 of the shell 2.

Sleeve 26 is provided with a plurality of sets of ports 28, 30, 32, 34, and 36, which communicate respectively with grooves 6, 8, 10, 12, and 14. Thus, in the preferred embodiment of the invention, communication between two or more grooves is by way of the interior of sleeve 26 and the associated ports. The sleeve 26 is removably secured in bore 4 by means of end caps 38 and 40. These caps are held in place by any suitable means such as threaded members 42 passing through the end caps and engaging the shell 2.

A hollow elongated main valve member 44 is reciprocably mounted in the sleeve 26. Main valve member 44 is provided with end pistons 46 and 48 and a plurality of port closers 50 and 52 between the end pistons 46 and 48. In the embodiment shown, the end pistons and port closers are of substantially the same external diameter as, and cooperate with, the inside diameter of the sleeve 26 to open and close certain of the sleeve ports. As is best seen in Fig. 1, port closers 50 and 52 preferably have a dimension in the axial direction which is sufficient to close a port when the port closer is alined therewith. It will be noted further that the main valve member 44 is itself provided with ports 54, 56 and 58. When the valve is in the central position shown in Fig. 1, these ports are alined with ports 28, 32, and 36 respectively.

It was pointed out above that the main valve member 44 is hollow. This hollow consists of an internal bore 60 in which a pilot valve member indicated generally at 62 is mounted for reciprocation. The pilot valve member consists of a hollow elongated element 64, of which the hollow 66 is blocked substantially midway between its ends by a plug 68 held in place by means of pins 70.

The elongated member is provided at its exterior with port closers 72, 74, and 76. These port closers are in effect the lands of a spool which fill up the internal bore 60 of the main valve member and thus serve to block fluid passage in an axial direction through the main valve member. In addition, the elongated member is provided with end pistons 78 and 80 which also have an external diameter such as to be reciprocable in and substantially block the internal bore 60 of the main valve member. As is best seen in Fig. 7, the end pistons 78 and 80 are preferably somewhat smaller than bore 60 to provide a clearance 82 and to permit a throttling effect in operation. The hollow elongated element of the pilot valve member is further provided with ports or fluid passages 84 and 86 at opposite sides of the plug 68 and with radial fluid passages 88 and 90 at its ends.

An actuating rod 94 threadedly engages the end 96 of the pilot valve member and a guide rod 98 threadedly engages the opposite end 100 of the pilot valve member. A suitable lock nut 102 engages each of the threaded portions of rods 94 and 98 to guard against loosening of the threaded connections. As will be well understood by those skilled in the art, the rods 94 and 98 pass through stuffing boxes 104, of which the packing and gland are secured between a flanged member 106 and a stuffing box cap 108. The flanged member 106 engages an end of sleeve 26 and also serves to hold a seal 110 in place in an annular recess provided for the purpose in each of end caps 38 and 40.

Operation

Let it be assumed that the description of the operation begins with the main valve member and the pilot valve member at the extreme right limits of travel (Fig. 3). Let it further be assumed that the hydraulic system is nearing the end of one phase of operation, at which time the valve must be reversed. At the appropriate time, suitable actuating mechanism pulls the pilot valve member leftward from the position shown in Fig. 3 into the operating position shown in Fig. 4. Thereupon, fluid under high pressure is admitted from the high pressure fluid connection 20 into groove 10, whence it passes through ports 32 in the sleeve 26, ports 56 in the main valve member, into the annular space between the main valve member and the pilot valve member, through ports 86 in the pilot valve member, along the right half of the hollow pilot valve member, and out through radial ports 90 in the end 100 of the pilot valve member, whereupon fluid at high pressure is admitted to the right end of main valve member 44 and also the right end of the pilot valve member.

Also, with the parts in this position, the left end of the main valve member is open to the low pressure fluid connection 16 by way of the annular passage between the main valve member and the pilot valve member, ports 54 in the main valve member, ports 28 in the sleeve, and groove 6. With the high fluid pressure at the right end of the main valve member and the pilot valve member, and low pressure at the left end, the system is unbalanced so far as pressure is concerned. As a result, the main valve member and pilot valve member move rapidly toward the left into the position shown in Figs. 6 and 7. The pilot valve member will reach the end of its travel first, and as the main valve member nears the end of its travel, end piston 78 enters the end of bore 60. The clearance 82 provides a throttling effect which cushions the stopping of the main valve member. If the main valve member should stick momentarily, it will be moved positively toward the left mechanically by the pilot valve member, as shown in Fig. 5. After it is thus started, the valve can be moved by the fluid pressure acting as aforesaid.

It will be apparent to those skilled in the art that I have here provided a reversing valve having numerous advantages, among which is reliability of operation due to a positive movement of the main valve member in case of seizure or sticking, after which movement is continued by the fluid pressure acting in the manner set forth. Other advantages will be apparent to those skilled in the art.

While there is in this application specifically described one form which the invention may assume in practice, it will be understood that this form of the same is shown for purposes of illustration, and that the invention may be modified and embodied in various other forms without departing from its spirit or the scope of the appended claims.

I claim:

1. In a reversing valve, a shell having an internal bore and a plurality of fluid passages through the shell, means for conducting a fluid under pressure to said shell, a hollow main valve member reciprocable in the shell and having at least one actuating piston and a means to prevent communication between certain passages and permit communication between certain passages according to its position, and a pilot valve member reciprocable in the main valve member and having at least one actuating piston, and a means for preventing and for permitting communication between said fluid under pressure and said one main valve actuating piston and said one pilot valve actuating piston means for moving said pilot valve relative to said main valve to provide communication between said fluid pressure conducting means and said one main valve actuating piston and said one pilot valve actuating piston to move said valves in one direction relative to said shell, means on said pilot valve for engaging said main valve to initiate movement of the latter if said fluid under pressure fails to do so and for striking said main valve at any point substantially throughout its distance of travel, if its movement is retarded, to urge it in said one direction of travel, and means to cushion the stopping of the main valve member by throttling including an end piston on said pilot valve spaced from said one pilot valve actuating piston and smaller than the hollow of said main valve member.

2. In a reversing valve, a shell having an internal bore and a plurality of fluid passages through the shell, means for conducting a fluid under pressure to said shell, a hollow main valve member reciprocable in the shell and having a pair of actuating pistons spaced apart longitudinally of said main valve member and a means to prevent communication between certain passages and permit communication between certain passages according to its position, and a pilot valve member reciprocable in the main valve member and having a pair of actuating pistons smaller than the hollow of said main valve member and spaced apart longitudinally of said pilot valve member and a means for preventing and for permitting communication between said fluid under pressure and said main valve actuating pistons and said pilot valve actuating pistons, means for moving said pilot valve relative to said main valve to provide communication between said fluid pressure conducting means and one of said main valve actuating pistons and one of said pilot valve actuating pistons to move said valves in one direction relative to said shell, means on said pilot valve for engaging said main valve to initiate movement of the latter if said fluid under pressure fails to do so and for striking said main valve at any point substantially throughout its distance of travel, if its movement is retarded, to urge it in said one direction of travel, and means including the other of said pilot valve pistons to cushion the stopping of the main valve member by throttling.

References Cited in the file of this patent

UNITED STATES PATENTS

| | | |
|---|---|---|
| 292,541 | Craig | Jan. 29, 1884 |
| 663,135 | Spencer | Dec. 4, 1900 |
| 927,560 | Lewis | July 13, 1909 |
| 992,161 | Catlin | May 16, 1911 |
| 2,361,757 | Fink | Oct. 31, 1944 |